A. C. EVERETT.
POWER TRANSMISSION.
APPLICATION FILED AUG. 16, 1913.
1,268,334.
Patented June 4, 1918.
3 SHEETS—SHEET 1.
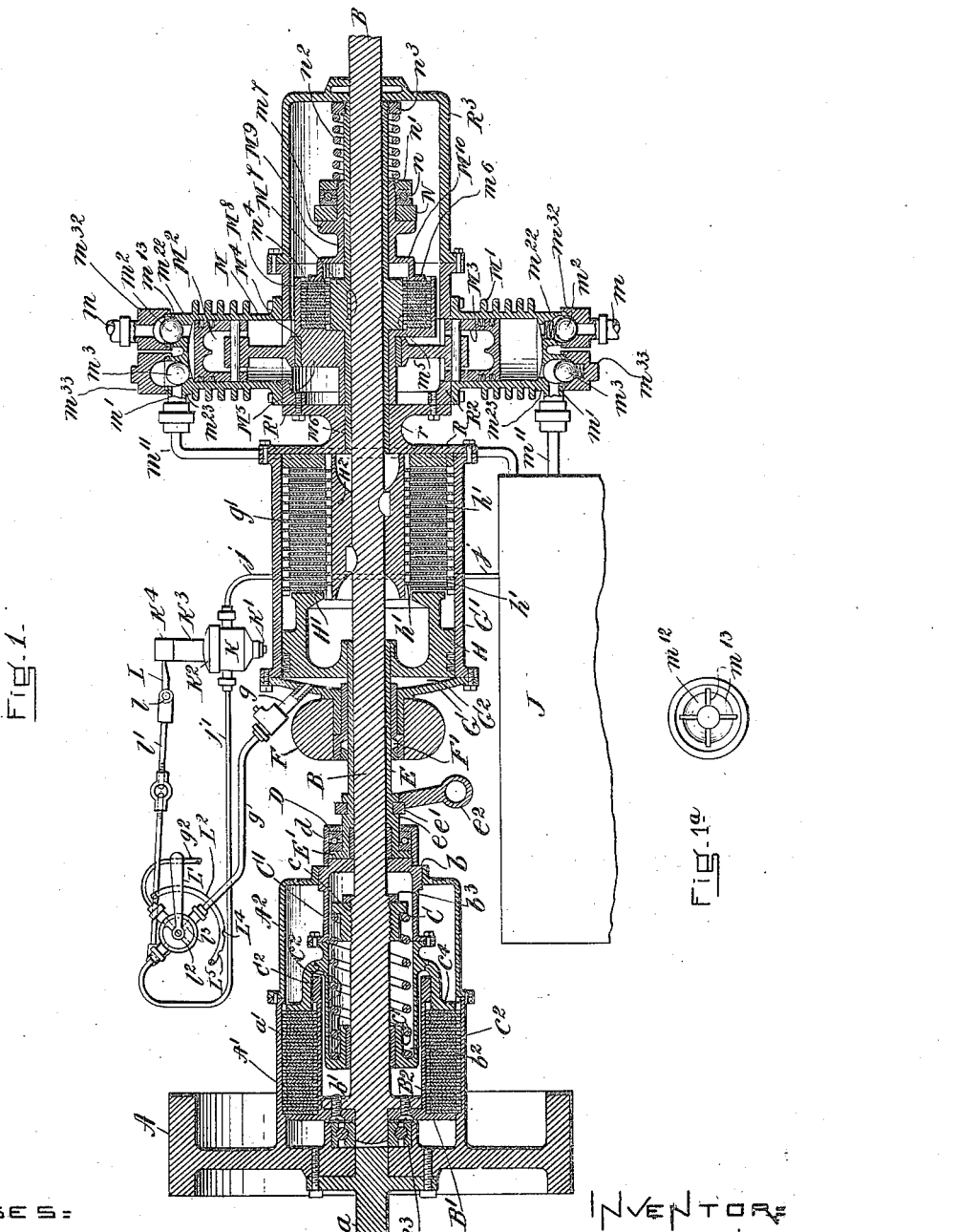

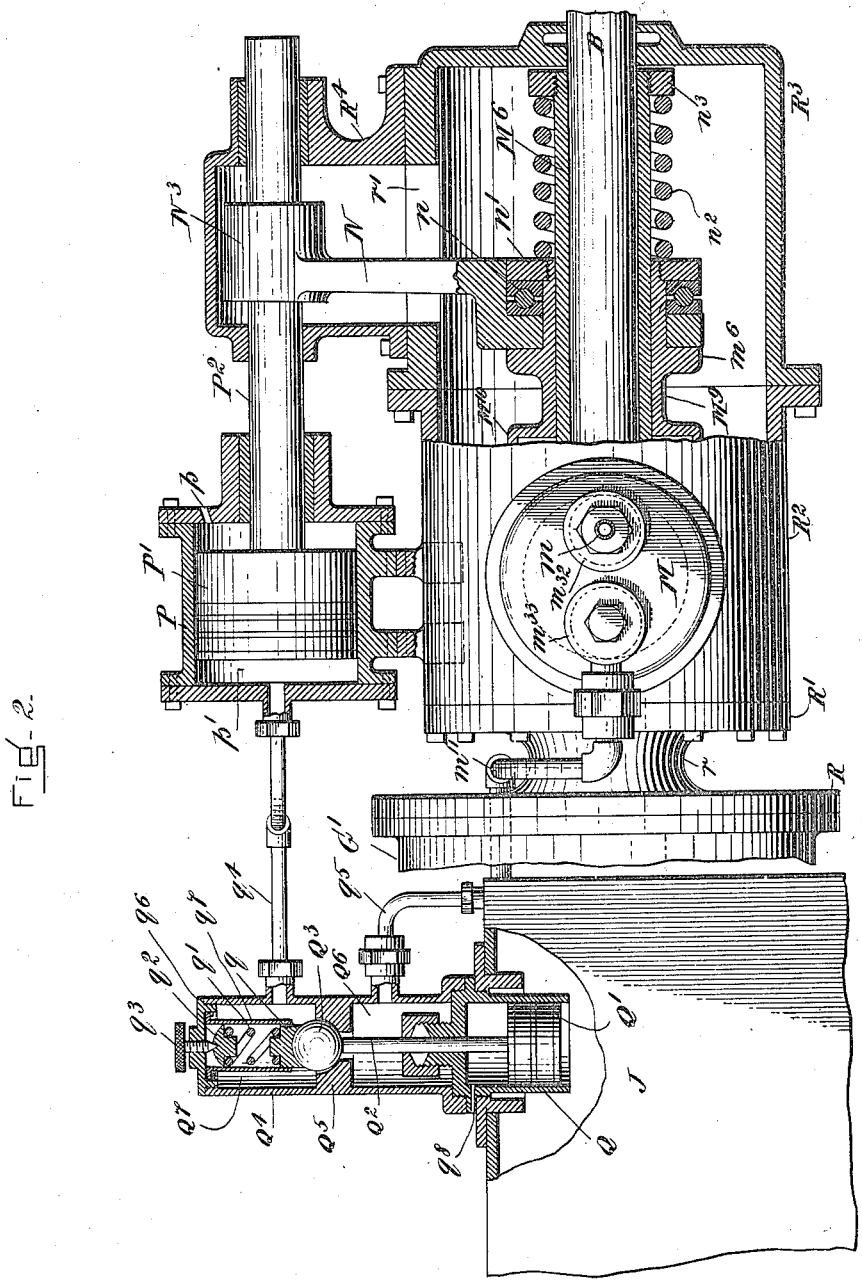

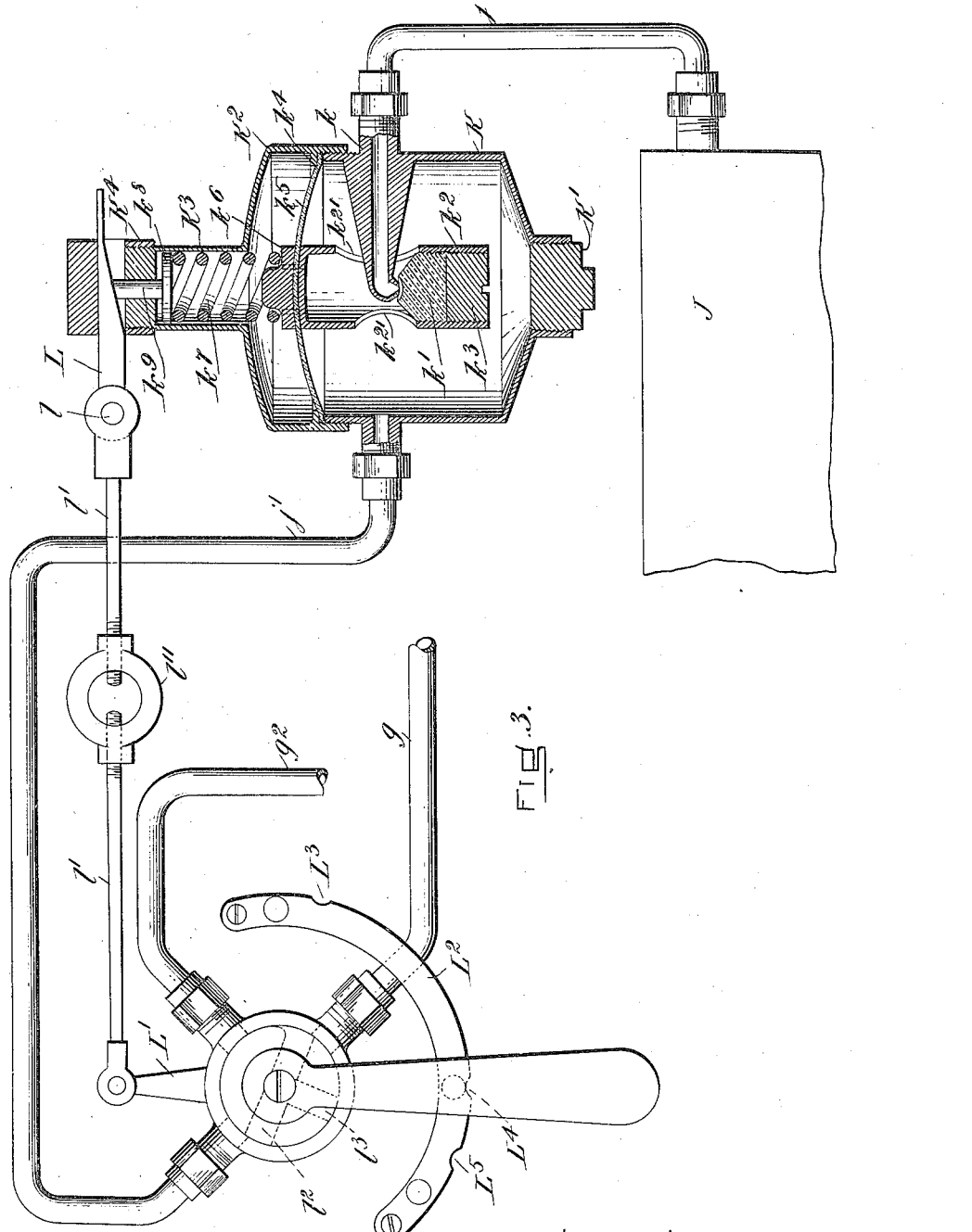

UNITED STATES PATENT OFFICE.

ARTHUR C. EVERETT, OF BOSTON, MASSACHUSETTS.

POWER TRANSMISSION.

1,268,334.  Specification of Letters Patent.  Patented June 4, 1918.

Application filed August 16, 1913. Serial No. 785,013.

*To all whom it may concern:*

Be it known that I, ARTHUR C. EVERETT, of Boston, in the county of Suffolk and State of Massachusetts, a citizen of the United States, have invented a new and useful Improvement in Power Transmission, of which the following is a specification.

My invention relates to a transmission especially applicable for automobiles and the like but useful for other purposes. It is especially adapted to be operated pneumatically, although it may be operated by hand or foot lever if thought best. I prefer, however, to operate it by compressed air because simply by the turning of a valve in one direction or the other the desired results may be obtained.

My invention will be understood by reference to the drawings, in which—

Figure 1 is a longitudinal section of the transmission embodying my invention; Fig. 1$^a$ being a detail of certain valve seats.

Fig. 2 is a view partly in elevation and partly in section taken in a longitudinal plane at right angles with the section of Fig. 1 and enlarged.

Fig. 3 is an enlarged view of the valve or cut-off mechanism, shown partly in section.

A is a balance wheel mounted on the end of a shaft $a$ connected to the source of power. The balance wheel A has a sleeve $A^1$ projecting from the face opposite that to which the shaft $a$ is attached which has a housing $A^2$ attached to its farther end, which housing closes in and engages a bearing $b$ on the transmission shaft B. The sleeve $A^1$ is grooved with a series of grooves, in each of which is carried a ring $a^1$. To the collar $b^1$ on the transmission shaft B is attached a collar $B^1$ in proximity to which the first one of a series of rings $a^1$ is located. The collar $B^1$ has a sleeve $B^2$ projecting from it which is also grooved and carries a series of rings $b^2$, each ring lying between two of the rings $a^1$. This construction is a construction well known in the art and need not be further described except to say generally that when the rings mounted in the sleeve $A^1$ and the rings mounted in the sleeve $B^2$ are pressed into contact a clutch is formed which causes the rotations of the balance wheel A to be transmitted to the transmission shaft B. A ball bearing $B^3$ takes up the end thrust of the shaft B.

My improvement relates more particularly to the means for compressing or closing together these rings $a^1$ and $b^2$. For this purpose the transmission shaft B carries a flanged nut $c$ held in place by a set nut $b^3$. Against this nut $c$ rests one end of an expansible spring C. The other end of this spring is contained within a housing $C^1$, made for convenience in two parts as shown, the inner end of said housing being turned inward and backward to form a bearing $c^1$ through which the transmission shaft B passes, and a recess $c^2$ against which the farther end of the spring C bears. The housing $C^1$ has mounted to turn upon it a cup-shaped member $C^2$, the extremity of which has a flange $c^4$ adapted to engage one of the rings $b^2$, and this construction is such that the effort of the spring C to expand drives this flange $c^4$ toward the rings $a^1$, $b^2$ and causes them to engage so that the clutch is established between the balance wheel A and the transmission shaft B through the instrumentality of the housing $A^2$ and collar $B^1$.

The housing $C^1$ does not turn with the transmission shaft B. It is connected with a flange $E^1$ on the end of a sleeve E which forms a bearing for the shaft B. This construction is made by a cap nut D which screws onto the end of the housing $C^1$. Between the flange $E^1$ and the nut D is preferably a ball bearing $d$ to take up the thrust. The sleeve E is preferably grooved as at $e$ to receive a ring $e^1$ carrying a hanger $e^2$ by which a forked or other lever of any character operable by hand or foot may be connected to the sleeve E to move it to the right (see Fig. 1) and withdraw the flange $c^4$ against the force of the spring C from engagement with or from applying pressure to the rings $a^1$, $b^2$, thus disconnecting the power shaft and the transmission. Upon release of the sleeve the spring C will again bring the flange into action to cause the engagement of the clutch, and the coupling together again of the power shaft and the transmission. I prefer, however, that this operation be caused by compressed air as I have described below.

F is a bearing shown in section which may be of any convenient shape and by means of which the mechanism may be supported from any suitable point, for example, from a flooring or frame as most convenient. This bearing also supports the head G of a cylinder $G^1$, within which is mounted the piston H. This piston H is threaded on to the end of the sleeve E so that the two will move longitudinally together while the transmission shaft B will rotate within the sleeve E. Thus the moving of the piston H to the right (see Fig. 1) will carry with it the sleeve E and flange $c^4$ as described above. The cylinder head G has a pipe connection $g$ with the valve mechanism to be described below by means of which compressed air enters the cylinder G, and to prevent escape the bearing F has within it and around the sleeve E a suitable stuffing box $F^1$ of any convenient type. The piston H is ring-shaped at its front end (see $H^1$), the forward end of this ring-shaped portion being adapted to engage one of a series of rings $g^1$, these rings being located in grooves in the interior of the cylinder $G^1$ precisely as the rings $a^1$ are located in corresponding grooves in the sleeve $A^1$. Similar rings $h^1$ are mounted in similar grooves in the collar $H^2$ keyed to the transmission shaft B.

It will be seen that the cylinder $G^1$ and the piston H do not revolve with the transmission shaft B. The part $H^2$, however, rotates with the transmission shaft B. When the spring C by expanding has caused the clutch $a^1$, $b^2$ to engage so that the transmission shaft B will be rotated by the shaft $a$ the part $H^1$ will be withdrawn so that the part $H^2$ with its rings may rotate without friction between the disks $g^1$ and $h^1$. When, however, the sleeve E has been moved to the right (see Fig. 1) the rings $a^1$ and $b^2$ are no longer in contact; that is, the clutch is rendered inoperative as a clutch and at the same time the rings $g^1$ and $h^1$ are brought into frictional contact and as the member $G^1$ is stationary these rings serve as a brake to check and finally stop the rotation of the transmission shaft B.

To operate these parts by pneumatic pressure I have shown an air tank J filled with air, kept under compression, which tank is connected by a pipe $j$ with the interior of a valve casing K. The type of valve to be used under these conditions is immaterial, but I prefer to use a check valve such as is shown in Fig. 3. This device comprises a nozzle $k$ on the end of pipe $j$, the end of this nozzle being closed by a valve $k^1$, say of hard rubber, mounted in a tube $k^2$ and held in place, adjustably, by means of a plug $k^3$ which screws into the end of the tube $k^2$. The tube $k^2$ has opening $k^{21}$ on each side through one of which the nozzle $k$ projects, the other serving for a free escape of air. The casing K has an opening in its bottom normally closed by a screw plug $K^1$, and it is closed at the top by a cap $K^2$, having a tube $K^3$ projecting upward from its middle portion. This cap $K^2$ screws down upon the main body of the casing and a diaphragm $k^5$ is clamped between an inwardly projecting collar $k^4$ and the top of the lower portion of the casing. To this diaphragm is attached in any suitable way the tube $k^2$. As shown the tube is closed at the top and a stud $k^6$ is riveted or soldered thereto, this stud serving as a lower bearing for a spring $k^7$ which lies within the tube $k^3$. A follower $k^8$ having a pin $k^9$ projecting from its upper end rests on top of the spring. The tube $K^3$ is closed at the top by a plug $K^4$ through which the pin $k^9$ passes, this plug having a transverse passage therethrough to serve as a guide for a wedge-piece L. This wedge-piece L is jointed as at $l$ and is attached to the end of a rod $l^1$, the other end of which is pivotally connected to the handle lever $L^1$. Preferably this rod $l^1$ is made as shown in two parts, connected by an ordinary turn buckle $l^{11}$ for purposes of adjustment. The lever $L^1$ is attached to a three-way cock, the lever being preferably in two parts, one part being attached to each end of the cock. It will be seen from this construction that when the handle of the lever $L^1$ is moved to the left (see Fig. 3), the wedge-piece L will be moved to the right and the diaphragm $k^5$ will be depressed. This will depress the valve $k^1$ and so open the nozzle K as to allow air to pass from the tank J through the pipe $j$ and out through the pipe $j^1$ to the cock and thence to the passage $l^2$ which then will be in register with it. Through the passage $l^2$ it will pass by the pipe $g$ to the chamber $G^1$ behind the piston H. The pressure thus exerted on the piston by the compressed air will cause the piston to move to the right carrying with it the sleeve E and the housing $C^1$ and compressing the spring C so that the pressure of the flange $c^4$ on the rings $a^1$, $b^2$ is released and they cease to act as a clutch. At the same time the surface $H^1$ of the piston H will engage the first ring $g^1$ of the series $g^1$, $h^1$ and will compress all the rings together and so slow down and finally stop the rotation of the part $H^2$ and the shaft B to which it is keyed. Thus the apparatus as a whole acts as a brake as well as a clutch.

When the lever is turned so that the passage $l^3$ in the cock registers with the pipe $g$, this will bring one end of the passage $l^2$ in register with the pipe $g^2$ and the passage $l^3$ in register with the pipe $g$, thus releasing air from the cylinder G and release the brake and allowing the spring C to expand engages the clutch.

In order to indicate the different positions of the passages $l^2$, $l^3$, I prefer to provide a segment $L^2$ which is notched at $L^3$, $L^4$, and $L^5$. When the clutch is to be opened and the brake set the handle of the lever $L^1$ is turned over the notch $L^5$ and when the air pressure is to be released it is turned so as to be over the notch $L^3$.

It will be seen that when the handle is turned to notch $L^5$ as described the wedge-piece L is moved to depress the diaphragm $k^5$ and move the valve $k^1$ from the mouth of the nozzle $k$ so as to allow the free entrance of air to the chamber $G^2$ and when the handle is turned to notch $L^3$ the wedge-piece L is withdrawn and the diaphragm is allowed to rise and close the valve.

When the handle is in the position shown in Fig. 3, i. e., over the notch $L^4$ it will be noted that there is a fractional registration between the passage $l^2$, the tube $j^1$ and the tube $g$, the position being such that sufficient air pressure will be established in the chamber $G^2$ to release the clutch without setting the brake thus allowing the machine to coast. In this case pressure will not build up in the chamber $G^2$ to the extent necessary to set the brake because back pressure in the valve chamber will lift the diaphragm $k^5$ and close the valve $k^1$ until the pressure decreases either by leakage or otherwise. The spring $k^7$ should be of such strength as to allow the diaphragm to rise sufficiently for the purpose under these circumstances. From the position shown in Fig. 3 to complete registration the pressure on the piston can be adjusted by the manipulation of the handle $L^1$ so as to give any desired control to the brakes.

Thus the throwing in of the clutch to cause the rotation of the shaft is caused by the spring C which holds the clutch in engagement and the disconnection of the clutch and the control of the rotation of the shaft by the brake is caused by compressed air.

In addition, however, the transmission will cause the supplying of pressure to the air in the air tank. This is accomplished in a similar way. While various forms of rotary air pumps might be used, I prefer to use one connectible to the transmission by a similar clutch as is shown in the drawings wherein M, $M^1$ are the cylinders, each having an inlet port $m$ and an outlet port $m^1$, these several ports being controlled by ball valves, the ball valves controlling the ports $m$ being lettered $m^2$ and the ball valves controlling the ports $m^1$ being lettered $m^3$. Each ball valve is held normally on its seat by a very light spring as shown.

Both the outlet ports $m^1$ are connected by pipes $m^{11}$ with the tank J. In order to allow air to pass in through the inlet ports I have provided the surfaces $m^{12}$ against which the valves $m^2$ are forced when the piston is drawing in air with passages marked $m^{13}$. The air will thus pass around the ball valves and into the cylinder as the piston is withdrawn from the head thereof.

In practice I prefer to provide each cylinder head with short hollow extensions $m^{22}$, $m^{23}$ and to close the ends of these extensions by caps $m^{32}$, $m^{33}$ which screw onto the ends thereof to form the valve chambers, the caps $m^{32}$ each having a passage through it to form or connect with a pipe forming the inlet port and the caps $m^{33}$ each being closed at the end.

The cylinders are mounted on opposite sides of a housing which is carried by a disk R closing one end of the cylinder $G^1$ and has a neck $r$ projecting from it through which runs the transmission shaft B and a sleeve $M^6$ surrounding the shaft and keyed thereto. At its other end the neck $r$ carries the disk $R^1$ to which is bolted the tube $R^2$ upon which the cylinders M, $M^1$ are bolted. Upon the outer end of this tube $R^2$ is bolted the closure $R^3$ which is slotted on its upper side as at $r^1$ to form a passage from the arm N, a cover $R^4$ being bolted to the closure $R^3$ to cover this passage and form a bearing for the rod $P^2$. The closure $R^3$ also has an opening in its end to allow the shaft $P^2$ to pass therethrough. Within these cylinders M, $M^1$, which are preferably ribbed exteriorly to get a better heat radiation system, are carried pistons $M^2$, $M^3$, these pistons being mounted upon a strap $M^4$ carried by an eccentric $M^5$ free to turn on the sleeve $M^6$. This construction being a well known method of securing reciprocation from rotary motion will not be further described. The sleeve $M^6$ has an enlarged portion $M^7$ which contains a series of grooves in which are mounted clutch rings $m^4$. The eccentric $M^5$ has a forwardly projecting housing $M^8$ which also carries clutch rings $m^5$. It will be seen that if the rings $m^4$, $m^5$ are brought into such close contact with each other as to produce the necessary amount of friction a clutch is formed which will cause the eccentric $M^5$ to rotate with the sleeve $M^6$ when the transmission shaft B rotates. To accomplish this result there is also mounted on the sleeve $M^6$ a second sleeve $M^9$ having a cup-shaped portion $M^{10}$ carrying a flange $m^6$ constructed and located to engage one of the rings $m^5$. The sleeve $M^9$ does not turn with the sleeve $M^6$. The sleeve $M^9$ also carries an annular projection $m^7$ against which is mounted an arm N which has an opening through it to receive a portion of the sleeve $M^9$. A portion of this arm N which surrounds the sleeve $M^9$ is recessed to receive ball bearings $n$, these ball bearings being of ordinary construction and being held within the recesses by means of a nut $n^1$ by which the sleeve $M^9$ and the arm N are connected. Against this nut rests a spiral spring $n^2$, the rear end of which rests upon a nut $n^3$ attached to the rear end of the sleeve $M^6$.

The spring $n^2$ is an expansion spring and tends to hold the flange $m^6$ of the sleeve $M^9$ against one of the rings $m^5$ so that these rings are normally held in clutch relation and when the transmission shaft is rotated the eccentric will be rotated and the pistons given their reciprocation to force air into the tank J. When this is unnecessary, that is, when sufficient compression of air in the tank J has been secured the arm N (see Fig. 3) is caused to compress the spring $n^2$ (that is, to release the pressure of $m^6$ upon the ring $m^5$) in the following manner:

P is a cylinder, one end of which is open to the atmosphere as by the passage $p$. $P^1$ is a piston movable in the cylinder P and connected by the rod $P^2$ with a boss $N^3$ on the end of the arm N so that the piston $P^1$ will move the arm N. Motive power is applied to the piston $P^1$ to move the arm N to compress the spring $n^2$ by means of compressed air supplied to the chamber $p^1$ at the farther end of the cylinder by the pipe $q^4$ in the following manner.

Projecting into the tank J through an opening in the top thereof is a cylinder Q closed at its upper end except for a gland through which passes a piston rod $Q^2$ to the lower end of which is connected the piston $Q^1$ which moves in the cylinder Q. To the upper end of the piston rod $Q^2$ is attached a ball valve $Q^3$. A housing $Q^4$ is mounted on the top of the cylinder Q which housing has a partition $Q^5$ extending across it near its middle, dividing it into two chambers $Q^6$ and $Q^7$ connected by an opening normally closed by the valve $Q^3$.

The top of the housing $Q^4$ is closed by a screw cap $q^6$ which carries a downwardly projecting tubular guide $q^7$, the lower end of which guides a block $q$ which rests on top of the valve. On this block rests a spring $q^1$ the upper end of which backs against a follower $q^2$. A set screw $q^3$ passing through this cap $q^6$ rests on this follower for the purpose of adjusting the strength of the spring. A pipe $q^5$ connects the chamber $q^6$ with the tank J and the pipe $q^4$ which leads to the piston chamber $p^1$ connects with the chamber $Q^7$. A relief passage $q^8$ allows air to escape from the chamber above the piston $Q^1$.

The strength of the spring $q^1$ being properly adjusted when the pressure of the tank has reached the desired limit the piston $Q^1$ will be lifted and will lift the valve $Q^3$ which will allow pressure to pass from the chamber $Q^6$ which is always connected with the tank J by the pipe $q^5$ to the chamber $Q^7$ and from there through the pipe $q^4$ to the chamber $p^1$. By means of the pressure thus established the piston $P^1$ will be driven to the right (see Fig. 2), carrying the arm with it and compressing the spring $n^2$, thus releasing the pressure on the rings $m^4$ $m^5$ and disconnecting the air pump from the transmission shaft B. When the pressure in the tank J is sufficiently reduced, to allow the spring $q^1$ to close the valve $Q^3$, the spring $n^2$ will expand bringing the parts into their former relation and again connecting the transmission shaft with the pump.

It is believed from the above description that the operation of this mechanism will be readily understood. It will be seen that normally the transmission shaft is in clutch because unless the main clutch which engages it with the balance wheel A is disconnected by compressed air the spring C will keep it in engagement. When the shaft B is rotating it is maintaining the pressure in the tank J at a predetermined amount which amount cannot be exceeded because of the safety appliance comprised in the arm N and the parts operating it and the parts which it operates which parts operate automatically. This pressure will be sufficient when applied as described either to disconnect the shaft B from the wheel A so that the machine will coast, or by a graduation of the amount of pressure used, through the wedge-piece L to put on the brake to the extent desired.

The advantage of such a mechanism as is described will appeal especially to those using automobiles, for the entire control will reside in the handle $L^1$ by the movement of which the operation of the transmission is governed.

Unless a suitable locked lever of ordinary construction is connected to the part $e^2$ (in which case the main clutch $a^1$, $b^2$ can be disconnected mechanically and will be connected until the proper moment) the tank J may well be filled with air compressed to the proper amount by the ordinary foot pump so that the main clutch will remain disconnected until it is desired to start the machine. After the machine is once connected up by the main clutch the air mechanism will work automatically.

In its broad aspect my invention does not relate so much to the details of mechanism as to the general combination of a clutch and brake mechanism controllable by compressed air which controls the movements of the transmission pump to operate the machine and also the air pump by which the pressure of the compressed air is maintained.

Many variations from the exact structure shown and described will therefore suggest themselves to those skilled in the art which suggestions will come within the scope of my invention.

While my invention is especially useful for automobile use it is equally applicable for use in other structures where control of transmission is desired.

What I claim as my invention is:

1. In a transmission mechanism, a power shaft, a transmission shaft, a sleeve mounted to slide longitudinally on said transmission shaft and to rotate therewith, means for connecting said power shaft and said transmission shaft to cause the rotation thereof, located at one end of said sleeve, and means for disconnecting said power shaft and said transmission shaft located at the other end of said sleeve, and means for moving said sleeve whereby said transmission shaft may be rotated or stopped, said means comprising a piston and spring and connections between said piston and spring and said sleeve, and means whereby compressed air may be supplied to said piston to operate it.

2. In a transmission mechanism, a power shaft, a transmission shaft, a sleeve mounted to slide longitudinally on said transmission shaft and to rotate therewith, means for connecting said power shaft and said transmission shaft to cause the rotation thereof, located at one end of said sleeve, and means for disconnecting said power shaft and said transmission shaft located at the other end of said sleeve, and means for moving said sleeve whereby said transmission shaft may be rotated or stopped, said means comprising a piston and spring and connections between said piston and spring and said sleeve, and means whereby compressed air may be supplied to said piston to operate it, said last-named means comprising an air pump, a clutch one member of which is connected to said transmission shaft to rotate therewith and the other member of which is slidably mounted on said transmission shaft, means for holding said members normally in contact, an air tank and means connected thereto and operated by high pressure therein whereby said two members may be separated and said air pump stopped.

3. In combination with a source of power, a shaft, a clutch and brake mechanism mounted thereon to operate in inverse relation substantially as described, a clutch-controlled air pump operated by said shaft, an air tank connected thereto, connections between said tank and said clutch and brake mechanism whereby the operation thereof may be controlled, and connections between said tank and said pump to control the air pressure in said tank.

4. In a device of the kind described, in combination with a source of power, a shaft, a spring-controlled clutch mounted on said shaft normally in connecting relation thereto, a compressed air tank, means connected with said tank and said clutch whereby the air pressure of said tank will release said clutch, a brake also mounted on said shaft connected to said clutch and operable inversely upon the release of said clutch, means operated by said shaft to control the supply of air pressure in said tank, and means whereby the action of air pressure upon said clutch and brake mechanism will be definitely controlled.

5. In a device of the kind described, in combination with a source of power, a shaft, a clutch and brake mechanism mounted thereon to operate in inverse relation substantially as described, an air tank, pneumatic means connecting said mechanism and said tank, an automatic check valve located in said pneumatic connection, and means operable by hand whereby the movement of said valve may be adjusted and the amount of pressure to be used will be definitely controlled.

ARTHUR C. EVERETT.

Witnesses:
THOMAS H. AMBROSE,
WM. E. BROWN.